United States Patent
Tarasuk-Levin et al.

(10) Patent No.: US 9,588,796 B2
(45) Date of Patent: Mar. 7, 2017

(54) LIVE MIGRATION WITH PRE-OPENED SHARED DISKS

(71) Applicant: VMware, Inc., Palo Alto, CA (US)

(72) Inventors: Gabriel Tarasuk-Levin, San Jose, CA (US); Patrick William Penzias Dirks, Los Gatos, CA (US); Haripriya Rajagopal, Sunnyvale, CA (US); Sujay Shrikant Godbole, Santa Clara, CA (US); Derek Uluski, Weymouth, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/587,980

(22) Filed: Dec. 31, 2014

(65) Prior Publication Data

US 2015/0378783 A1    Dec. 31, 2015

Related U.S. Application Data

(60) Provisional application No. 62/018,582, filed on Jun. 28, 2014, provisional application No. 62/018,580, filed on Jun. 28, 2014, provisional application No. 62/041,047, filed on Aug. 23, 2014.

(51) Int. Cl.
  *G06F 9/455* (2006.01)
  *G06F 17/30* (2006.01)
  *G06F 9/48* (2006.01)

(52) U.S. Cl.
  CPC ........ *G06F 9/45558* (2013.01); *G06F 9/4856* (2013.01); *G06F 17/30578* (2013.01); *G06F 2009/4557* (2013.01); *G06F 2009/45583* (2013.01)

(58) Field of Classification Search
  CPC .......... G06F 9/4856; G06F 2009/4557; G06F 9/45558
  USPC ............................................................ 718/1
  See application file for complete search history.

(56) References Cited

U.S. PATENT DOCUMENTS

| | | | |
|---|---|---|---|
| 5,832,484 A * | 11/1998 | Sankaran | .......... G06F 17/30362 |
| 7,680,919 B2 | 3/2010 | Nelson | |
| 8,335,899 B1 | 12/2012 | Meiri | |
| 8,407,182 B1 | 3/2013 | Rajaa | |
| 8,527,990 B1 | 9/2013 | Marathe | |
| 8,875,134 B1 | 10/2014 | van der Goot | |
| 8,954,408 B2 * | 2/2015 | Dudgeon | .......... G06F 17/30371 |
| | | | 707/704 |
| 8,966,211 B1 | 2/2015 | Arnon | |
| 9,043,640 B1 | 5/2015 | Havemose | |
| 9,081,842 B1 | 7/2015 | Natanzon | |
| 9,201,802 B1 * | 12/2015 | Armangau | .......... G06F 12/0875 |

(Continued)

OTHER PUBLICATIONS

Chavis, John Q., "Office Action", U.S. Appl. No. 14/588,023, mailed Feb. 2, 2016, 6 pages.

(Continued)

*Primary Examiner* — John Chavis

(57) ABSTRACT

Examples perform live migration of virtual machines (VM) from a source host to a destination host. The live migration performs time-consuming operations before the source host is stunned, reducing the downtime apparent to users. Some examples contemplate pre-copying memory from the source VM to the destination VM, and the opening of disks on the destination VM before stunning the source VM.

20 Claims, 10 Drawing Sheets

(56) References Cited

U.S. PATENT DOCUMENTS

| | | |
|---|---|---|
| 9,251,004 B1 | 2/2016 | Havemose |
| 2004/0047466 A1 | 3/2004 | Feldman |
| 2005/0289143 A1 | 12/2005 | Oshri |
| 2007/0168284 A1 | 7/2007 | Factor |
| 2008/0127182 A1* | 5/2008 | Newport ............... G06F 9/4856 718/1 |
| 2009/0063751 A1 | 3/2009 | Dow |
| 2010/0064144 A1 | 3/2010 | Kaabouch |
| 2010/0281273 A1 | 11/2010 | Lee |
| 2011/0099318 A1 | 4/2011 | Hudzia |
| 2011/0321041 A1 | 12/2011 | Bhat |
| 2012/0233285 A1 | 9/2012 | Suzuki |
| 2012/0284234 A1 | 11/2012 | Mashtizadeh |
| 2012/0284707 A1* | 11/2012 | Janakiraman ......... G06F 3/0607 718/1 |
| 2013/0031069 A1* | 1/2013 | Dudgeon .......... G06F 17/30171 707/704 |
| 2013/0042241 A1 | 2/2013 | Lorenc |
| 2013/0247020 A1 | 9/2013 | Fontignie |
| 2013/0290661 A1 | 10/2013 | Reuther |
| 2014/0068127 A1 | 3/2014 | Baron |
| 2014/0115161 A1* | 4/2014 | Agarwal ............. G06F 9/45558 709/226 |
| 2014/0189672 A1* | 7/2014 | Raundahl Gregersen ................ G06F 8/67 717/168 |
| 2014/0229697 A1 | 8/2014 | Colbert |
| 2014/0282536 A1 | 9/2014 | Dave |
| 2014/0310800 A1 | 10/2014 | Kabra |
| 2014/0344395 A1 | 11/2014 | Alexander |
| 2015/0074453 A1 | 3/2015 | Fleming |
| 2015/0178108 A1 | 6/2015 | Tarasuk-Levin |
| 2015/0178109 A1 | 6/2015 | Li |
| 2015/0205542 A1* | 7/2015 | Antony ................ G06F 3/0647 711/162 |
| 2015/0212839 A1 | 7/2015 | Tsirkin |
| 2015/0254424 A1 | 9/2015 | Guay |
| 2015/0278041 A1 | 10/2015 | Ganesan |
| 2015/0370660 A1 | 12/2015 | Pershin |
| 2016/0055019 A1 | 2/2016 | Thakkar |
| 2016/0105378 A1 | 4/2016 | Xia |
| 2016/0191332 A1 | 6/2016 | Markley |

OTHER PUBLICATIONS

Lui et al., "Live Virtual Machine Migration Via Asynchronous Replication and State Synchronization", Dec. 2011, 14 pages.

Chavis, John Q., "Office Action", U.S. Appl. No. 14/752,643, mailed Jul. 5, 2016, 17 pages.

Chavis, John Q., "Office Action", U.S. Appl. No. 14/587,826, mailed Jan. 13, 2016, 9 pages.

Chavis, John Q., "Office Action", U.S. Appl. No. 14/752,668, mailed Jul. 28, 2016, 14 pages.

Do, Stephen M., "Office Action", U.S. Appl. No. 14/752,652, mailed Sep. 1, 2016, 33 pages.

Chavis, John Q., "Notice of Allowance", U.S. Appl. No. 14/752,674, mailed Jul. 20, 2016, 14 pages.

Hailu, Teshome, "Office Action", U.S. Appl. No. 14/752,635, mailed Oct. 7, 2016, 20 pages.

Chavis, John Q., "Notice of Allowance", U.S. Appl. No. 14/587,826, mailed Dec. 21, 2016, 19 pages.

* cited by examiner

LIVE MIGRATION WITH PRE-OPENED SHARED DISKS

CROSS-REFERENCE TO RELATED APPLICATIONS

This application claims the benefit of U.S. Provisional Patent Application Ser. No. 62/018,582, filed Jun. 28, 2014 entitled "Live Migration with Pre-Opened Shared Disks", U.S. Provisional Patent Application Ser. No. 62/018,580, filed Jun. 28, 2014 entitled "Using Active/Active Asynchronous Replicated Storage for Live Migration", and U.S. Provisional Patent Application Ser. No. 62/041,047, filed Aug. 23, 2014 entitled "Live Migration of Virtual Machines with Memory State Sharing", all of which are incorporated by reference herein in their entireties.

This application is related to U.S. Non-Provisional Patent Applications entitled "Using Active/Active Asynchronous Replicated Storage for Live Migration" and "Live Migration of Virtual Machines with Memory State Sharing", filed concurrently herewith, both of which are incorporated by reference herein in their entireties.

BACKGROUND

Some existing systems migrate virtual machines (VMs) from a source host computing device to a destination host computing device. For example, the vMotion process from VMware, Inc. moves live, running VMs from one host to another without any perceptible service interruption. During the existing process of closing disks and releasing locks at the source host computing device, and then reopening disk and acquiring locks at the destination host computing device, the VM 'downtime' or switchover time (e.g., the time a VM is not executing guest instructions during vMotion) is noticeable by customers because their workloads are stalled for the duration of that disk ownership handoff.

Some existing methods have switchover times, end-to-end, typically taking less than one second. However, some systems have many more disks per VM, to the point where a single VM may have over 100 disks. Closing and opening 100 disks during the downtime is problematic, at least because it can cause switchover times to extend to 2-5 seconds or greater.

In some examples, the disks are file extents on a VM file system (VMFS) or network file system (NFS), with disk open operations involving little more than simply opening the flat files and taking locks. However, with the advent of virtual volumes (VVOLs) and virtual storage array network (vSANs), object-backed disks are now supported for live migration. With VVOL and vSAN, opening a disk is far more complex. For example, the host calls out to an external entity, such as a vendor provider (VP), to request that the particular object be bound to the host. A number of other calls flow back and forth between the host and VP to prepare and complete the binding process. Only after that communication finishes can locks of the disk be acquired. The disk open is then declared to have completed successfully. Opening a single VVOL or vSAN disk, then, may take a full second or greater thereby increasing the downtime and reducing switchover performance. Moreover, in this example, the switchover performance is now dependent on performance of code from the VP (e.g., to release and bind locks).

Some existing methods of optimizing disk handoff during switchover have involved prepopulating disk lookup information at the destination host, and/or use multiple threads to concurrently open disks. However, there is no guarantee that any number of concurrent requests will be handled in parallel.

Even with the existing methods of disk handoff and live migration, it is increasingly difficult to migrate more complicated and larger systems from a source VM to a destination VM without increasing VM downtime. Further, with some of the existing systems, the disks are maintained by VPs which creates uncontrollable or unknowable VM downtimes because of the partner code run by the VPs. This can create visible delays in processing during live migration that are unacceptable to users.

SUMMARY

One or more examples described herein enable live migration using shared disks of a source virtual machine (VM) to a destination VM. A processor opens one or more disks of the source VM in non-exclusive mode on the destination VM while the source VM is still executing, to enable pre-copy from the source VM to the destination VM. The processor executes the destination VM after receiving a virtual device state of the source VM, and the processor changes the disks on the destination VM from the non-exclusive mode to an exclusive mode after the source VM closes the disks.

To facilitate the live migration, some examples described herein downgrade the disk locks to multiwriter lock mode, thus permitting both the source VM and destination VM to access the disk. However, the destination VM is prevented from writing to the disks during the multiwriter lock mode.

This summary introduces a selection of concepts that are described in more detail below. This summary is not intended to identify essential features, nor to limit in any way the scope of the claimed subject matter.

DETAILED DESCRIPTION

Aspects of the disclosure present a live migration scheme that accommodates VMs having numerous disks 534, and accounts for potentially longer switchover times due to opening/closing those disks 534. In some examples, disk operations are performed while a source VM 506 is still running, which keeps the switchover time to a minimum. For example, rather than sequentially providing exclusive access to disks 534 involved in a live migration, aspects of the disclosure overlap shared access to the disks 534 (e.g., by the source VM 506 and a destination VM 526) which effectively moves expensive disk operations to outside a downtime window. Even though both the source VM 506 and the destination VM 526 share a writeable state to the disks 534, at least the destination VM 526 is prevented from writing to these disks 534 while sharing access. In some examples, the source VM 506 is also prevented from writing to these disks 534 at this time. This prevents corruption of the disks 534 and prevents the introduction of inconsistencies in the disks 534.

Shared access to the disks 534 is implemented by shared disk locks, multiwriter locking, and/or other means.

The live migration described herein improves the functioning of VMs, and provides continuity of service as a VM is migrated from one host to another. Further, VM downtime (or unavailability) is decreased during the live migration. In some examples, there is no noticeable delay for users in accessing the VM, thereby improving the human-machine interface experience.

Examples of the modified live migration process are described as follows, although variations in the operations to achieve similar results are within the scope of the disclosure. Further, while the operations are sequentially ordered in the figures (e.g., FIG. 4), flexibility in the order of execution of the operations is within the scope of the disclosure so long as at least some of the expensive (e.g., time-consuming) disk operations are removed from the switchover time window. Further, in an example, the operations are performed in response to a request for live migration of the source host 502 to a destination host 522.

Exemplary operations associated with live migration are described in the context of a virtualized environment, such as next described with reference to FIG. 1.

Figure 1:
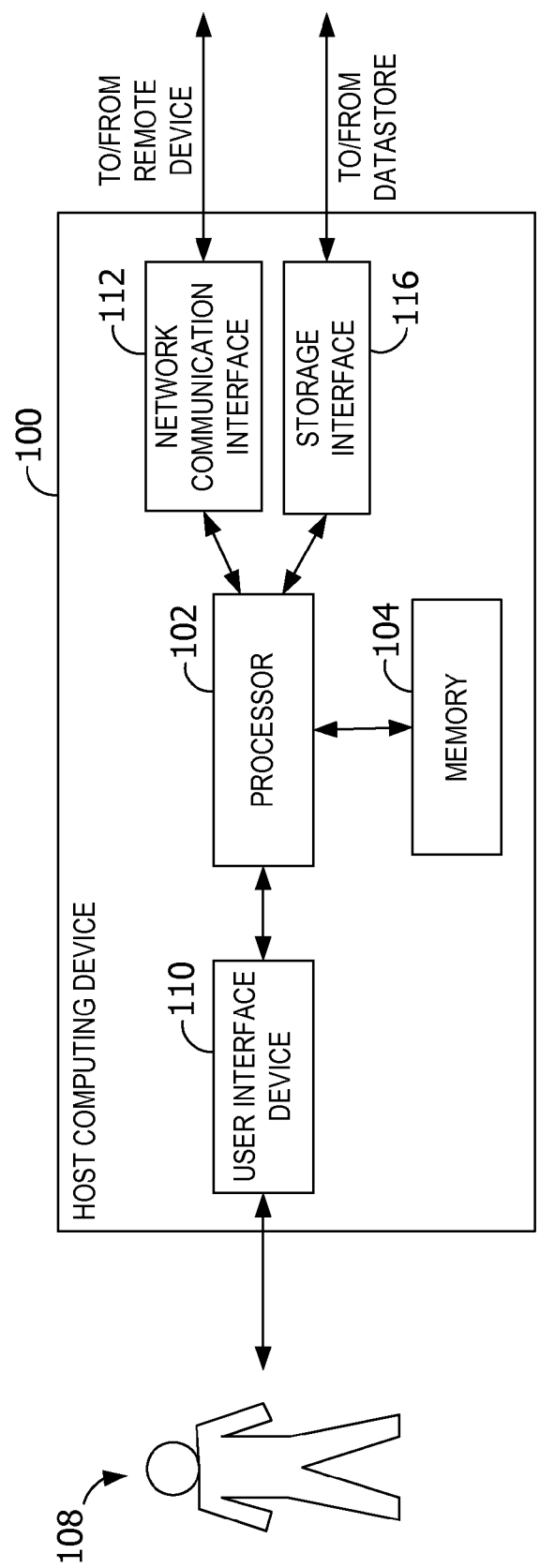
FIG. 1 is a block diagram of an exemplary host computing device.

FIG. 1 is a block diagram of an exemplary host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 includes one or more random access memory (RAM) modules, flash memory modules, hard disks, solid-state disks, and/or optical disks. In FIG. 1, memory 104 refers to memory and/or storage. However, in some examples, memory 104 refers only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In some examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
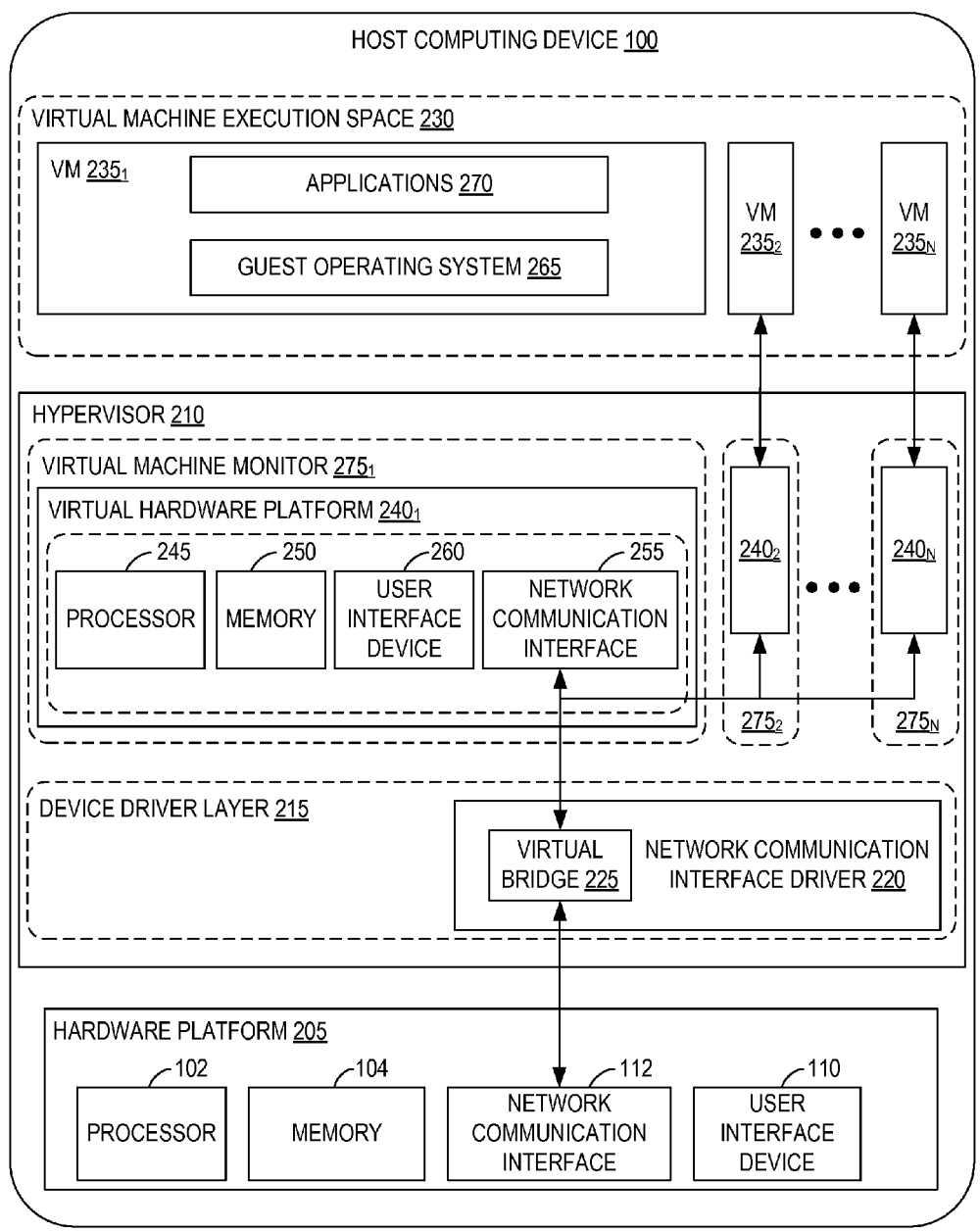
FIG. 2 is a block diagram of virtual machines that are instantiated on a computing device, such as the host computing device shown in FIG. 1.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid-state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 to execute applications 270 for an instantiated VM, such as first VM $235_1$. Aspects of the disclosure are operable with any computer architecture, including non-x86-compatible processor structures such as those from Acorn RISC (reduced instruction set computing) Machines (ARM), and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

The host computing device may include any computing device or processing unit. For example, the computing device may represent a group of processing units or other computing devices, such as in a cloud computing configuration. The computing device has at least one processor 102 and a memory area (e.g., memory area 504 or memory area 524). The processor 102 includes any quantity of processing units, and is programmed to execute computer-executable instructions for implementing aspects of the disclosure. The instructions may be performed by the processor 102 or by multiple processors 102 executing within the computing device, or performed by a processor external to computing device. In some examples, the processor 102 is programmed to execute instructions such as those illustrated in the figures.

The memory area includes any quantity of computer-readable media associated with or accessible by the computing device. The memory area, or portions thereof, may be internal to the computing device, external to the computing device, or both.

Figure 3:
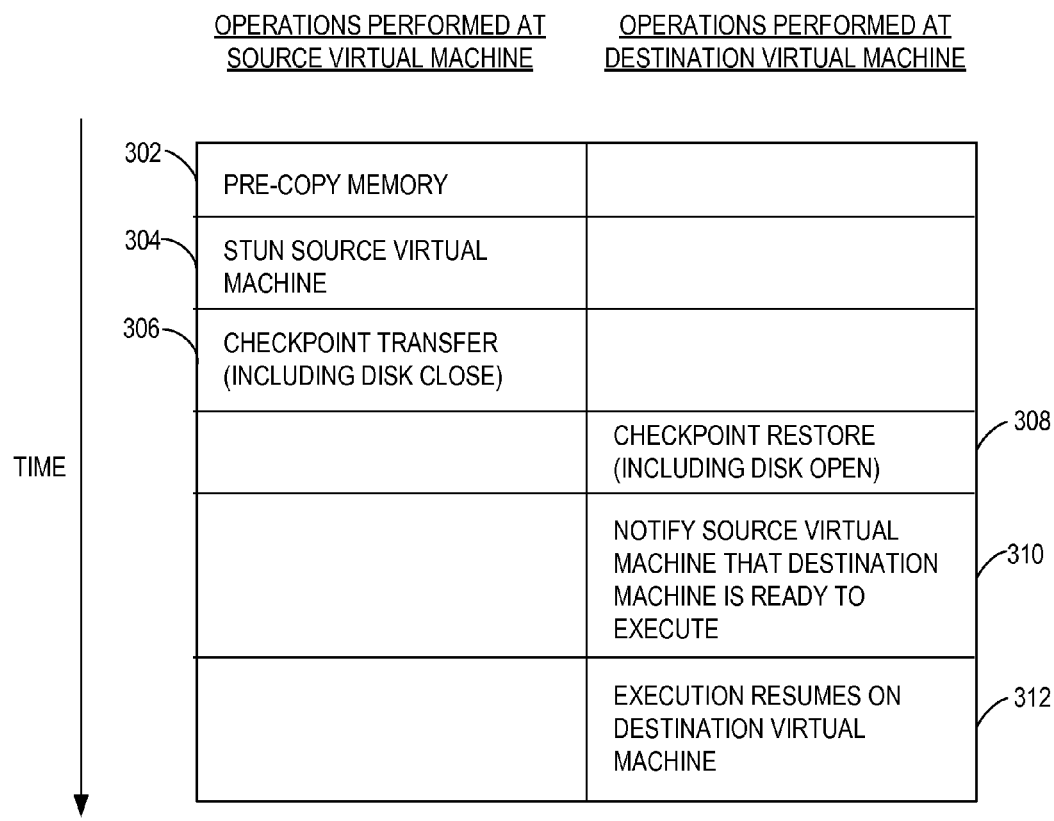
FIG. 3 is an exemplary sequence of migration as performed by a source VM and a destination VM as known in the art.

FIG. 3 is an exemplary sequence of migration as performed by a source VM 506 and the destination VM 526 as known in the art. Some existing systems migrate VMs from a source host 502 computing device to the destination host 522 computing device. For example, the vMotion process from VMware, Inc. moves live, running VMs from one host to another. At 302, the memory of the source VM 506 on the source host 502 is pre-copied. Once the memory has been pre-copied from the source VM 506, the source VM 506 is stunned at 304.

After the source VM 506 is stunned at 304, a virtual device state of the source VM 506 on the source host 502 is serialized, its disks 534 are closed (e.g., VM file systems, logical unit numbers, etc.), and its exclusive disk locks are released at 306. These operations are often collectively referred to as a "checkpoint transfer". The virtual device state includes, for example, memory, queued input/output, the state of all virtual devices of the VM, and any other virtual device side memory.

At this point in the timeline, the destination VM 526 executes a checkpoint restore at 308. The checkpoint restore includes opening the disks 534 and acquiring exclusive disk locks to those disks 534 at 308. Restoring the virtual device state includes applying checkpoints (e.g., state) to the destination VM 526 to make the destination VM 526 look like (e.g., a copy of) the source VM 506. Once the checkpoint restore is complete, the destination VM 526 informs the source VM 506 that the destination VM 526 is ready to execute at 310. The execution of the VM then resumes on the destination VM at 312.

Figure 4:
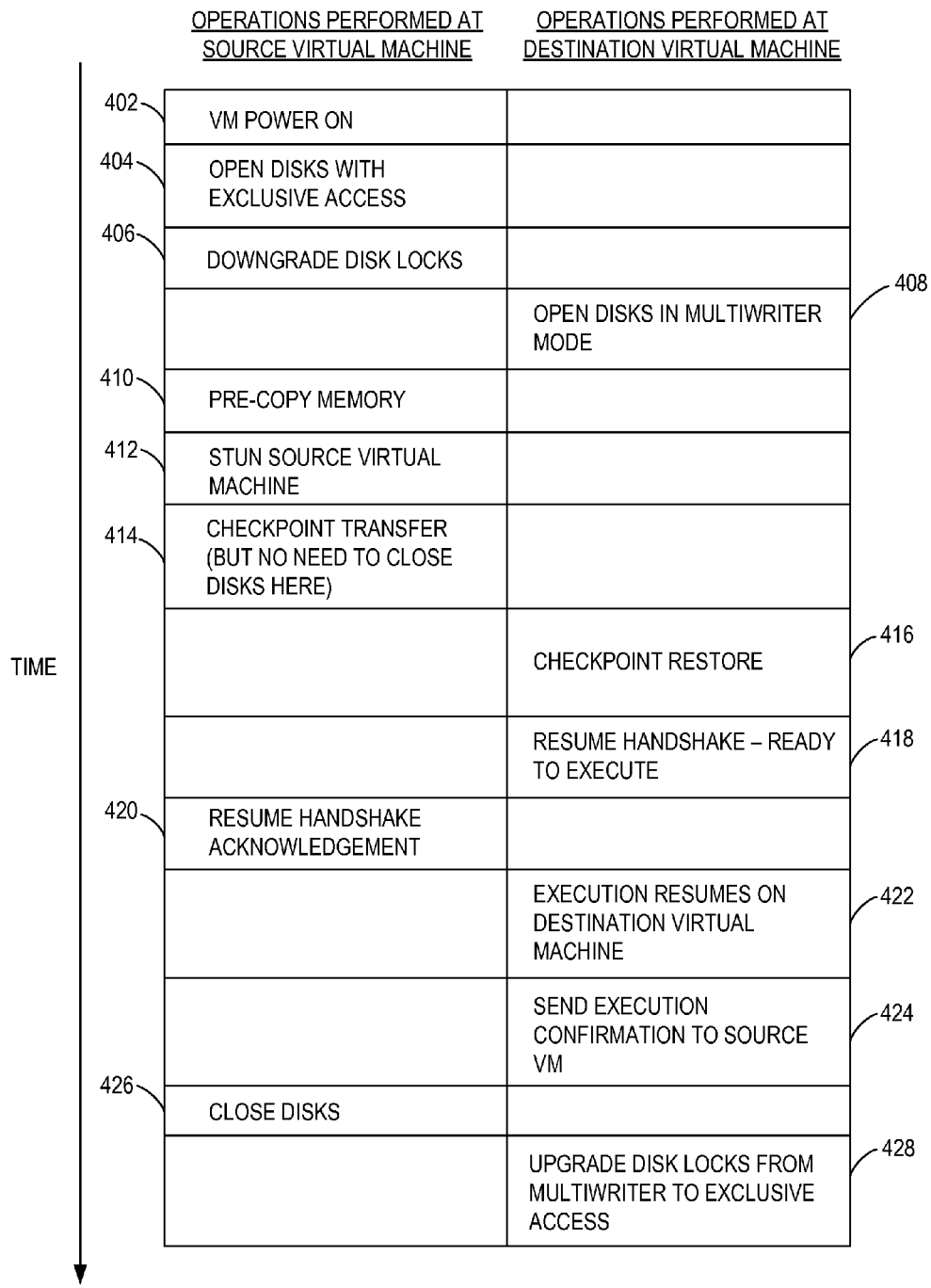
FIG. 4 is an exemplary sequence of live migration as performed by a source VM and a destination VM with the disks being opened in multiwriter mode.

FIG. 4 is an exemplary sequence of live migration as performed by the source VM 506 and the destination VM 526 using shared disks. The source VM powers on at 402. If the source VM 506 is already powered on, this step may be omitted. In some examples, the source VM 506 may be powered on by a timer or on a schedule. The schedule is established, for example, by the user, a processor of the source host 502, or a third-party transmitting instructions to the source host 502.

Once the source VM 506 is powered on 402, the source VM 506 opens its associated disks 534 with exclusive access at 404. At 406, with the workload of the VM still running, the source VM 506 downgrades its disk locks from exclusive locks to multiwriter disk locks, or other shared disk locks. In another example, the disk locks are downgraded to an authorized user status. The authorized users are established as the source VM 506 and the destination VM 526. This step is omitted in the event that there are no locks on the disks 534. This may occur at any time prior to stunning the source VM at 412. The I/O impact of downgrading the disk locks, even for VVOLs, is small as the guest may try to send I/O, and the system goes to the disk to validate that the lock is still held because the lock is on the proxy for VVOLs (e.g., VVOLs 922), and not the actual backend. Upgrading/downgrading locks on a proxy file involves trivial resources and/or processing. In some examples, the source VM 506 sends a message to the destination VM 526 that multiwriter mode is available for the disks 534 to be migrated.

After the disks 534 have been downgraded by the source VM at 406, the destination VM 526 binds and opens all VM disks 534 in multiwriter lock mode at 408. For VVOLs, depending on the size and location of the disks 534, this step may be time intensive. In examples where the disks 534 managed by vendor providers (VPs) 532, the code utilized by the VPs 532 may negatively impact the disk opening times.

The source VM 506 pre-copies its memory at 410. This may take anywhere from seconds to hours. Pre-copying is complete when the memory at the destination VM 526 is approximately the same as the memory at the source VM 506. Although represented as occurring after the destination VM 526 has opened the disks 534 in multiwriter mode at 408, the pre-copying may occur anytime after downgrading the locks. Any form of memory copy is contemplated. The disclosure is not limited to pre-copy. Further, the memory copy is performed at any time, even post-switchover (e.g., after the destination VM 526 is executing and the source VM 506 has terminated).

Once the memory has been pre-copied from the source VM at 410, the source VM 506 is stunned at 412. Stunning freezes or otherwise suspends execution of the source VM 506, in contrast to quiescing the source VM 506. That is, in some examples, no cleanup or shutdown operations normally associated with quiescing are performed.

Once stunned, the virtual device state of the source VM 506 is serialized for transmission to the destination VM as part of a checkpoint transfer at 414. Serializing the virtual device state of the source VM 506 on the source host 502 includes, in some examples, closing disks 534 (e.g., VM file systems, logical unit numbers, etc.) and releasing exclusive disk locks. The virtual device state includes, for example, memory, queued input/output, the state of all virtual devices of the VM, and any other virtual device side memory. There is no need to close any disks 534 during this operation.

Upon receipt of the information in the checkpoint transfer, the destination VM 526 engages in a checkpoint restore at 416. For example, the destination VM 526 restores the virtual device state of the source VM 506 at the destination VM 526 after the VPs 532 indicate that the disks 534 have been opened successfully in multiwriter mode for the destination VM 526. However, there is no need to open the disks 534 at this point because that occurred earlier at 408.

In some examples, the destination VM 526 then transmits an explicit message to the source VM 506 that the destination VM 526 is ready to start executing at 418. Some examples contemplate a one-way message sent from the destination VM 526 to the source VM 506 informing the source VM 506 that the destination VM 526 is ready to execute. This one-way message in vMotion is sometimes referred to as part of a Resume Handshake. The source VM 506, in this example, replies with a message that the destination VM 526 is ok to execute at 420, or otherwise confirms receipt of the message from the destination VM 526. In yet another example, a processor (e.g., processor 102) queries and updates both the source and the destination VMs for status reports regarding the checkpoint transmission and restoration.

After receiving that acknowledgement from the source VM 506, the destination VM 526 begins executing at 422. In some examples, after the start of execution, the destination VM 526 sends a confirmation to the source VM 506 that execution has begun successfully at 424. In response to receiving confirmation that the destination VM 526 has begun execution, the source VM 506 closes (e.g., terminates) which includes releasing its multiwriter disk locks at 426.

Since the source VM 506 has released its disk locks, the destination VM 526, with the workload already running and issuing disk input/output (I/O), transparently upgrades its locks from multiwriter to exclusive ownership at 428.

In this example, the source VM 506 cooperatively gives permission for the destination VM 526 to pre-open the disks 534 to be involved in the live migration while the source VM 506 is still actively accessing those disks 534. The destination VM 526, via the live migration protocol, ensures that the destination VM 526 will not issue I/O to those disks 534 until after the switchover has completed. In this manner, only one host or the other is able to issue write commands to the disks 534, despite them being concurrently open on both hosts during migration.

Using these techniques, the expensive disk open operations are pushed to occur outside of the switchover time or downtime, and while the source VM workload is still running thereby guaranteeing that disk open time does not impact the switchover performance contract of the live migration. Downtime is much shorter, from stunning the source VM 506 to the resume handshake communications.

Further, as a fallback path, if the stun operation takes too long to complete (or fails completely), the live migration is abandoned with no perceptible performance impact to the customer.

In this example, hypervisor 210 coordinates the operations for the live migration between the source VM 506 and the destination VM 526. However, each VM executes the appropriate commands, locally. Specifically, hypervisor 210 coordinates the sequencing of the operations shown in FIG. 4, but the source VM 506 and destination VM 526 execute those operations. For example, in FIG. 4 the source VM 506 downgrades the disk locks before the destination VM 526 opens the disks 534 in multiwriter mode. Hypervisor 210 coordinates these commands, ensuring that the source VM 506 downgrades the disk locks first, and then instructs (or relays commands to) the destination VM 526 to open the disks 534 in multiwriter mode.

Figure 5:
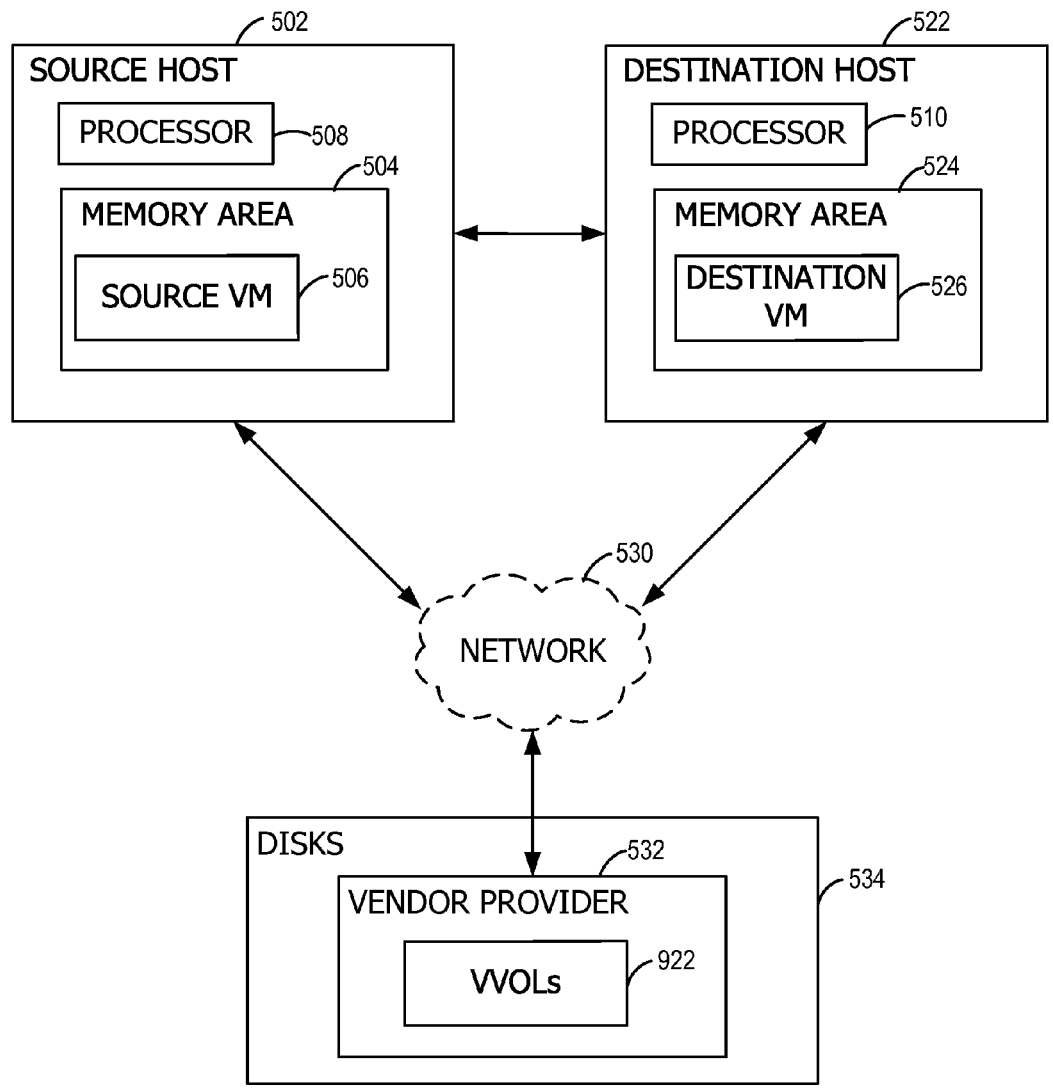
FIG. 5 is a block diagram of a system for performing live migration of a source VM to a destination VM involving shared disks.

FIG. 5 is a block diagram of an exemplary system architecture for performing live migration of the source VM 506 to the destination VM 526 having shared disks 534 accessible by a network 530. In some examples, the shared disks are VVOLs, such as VVOLS 922 maintained by one or more VPs 532. In general, the system includes the source host 502 and the destination host 522. Each host contains, for example, a processor (e.g., processor 508 or processor 510) and a memory area (e.g., memory area 504 or memory area 524). One or more VMs are contained within the memory area of each host. In one example, the source host 502 and destination host 522 communicate directly with each other. The source host 502 and destination host 522 also, in this example, communicate with at least one storage disk. The storage disk may be one of any number of disks that are locally or remotely accessible, including a virtual storage array, NFS, VMFS, VVOL, and vSAN. The storage disk is accessible through the network 530, in this example.

In the example of FIG. 5, the source VM 506 is located on the source host 502, and the destination VM 526 is located on the destination host 522. The source host 502 and destination host 522 communicate directly, in this example. The source host 502 and destination host 522 also communicate with one or more storage disks 534, such as VVOLs 922 in the example of FIG. 5. VVOLs 922 are managed by one or more VPs 532, or other array providers, that allow shared access to the VVOLs 922. The VVOLs 922 illustrated in FIG. 5 are maintained by one or more of the VPs 532. In the example, the source host 502 and destination host 522 communicate with the VVOLs 922 through the network 530.

In this example of a system with shared disks 534, live migration is performed by multiple processors, coordinated by hypervisor 210. A processor 508 of the source VM 506 and a processor 510 of the destination VM 526 respond to (e.g., execute) commands issued by hypervisor 210.

Figure 6A:
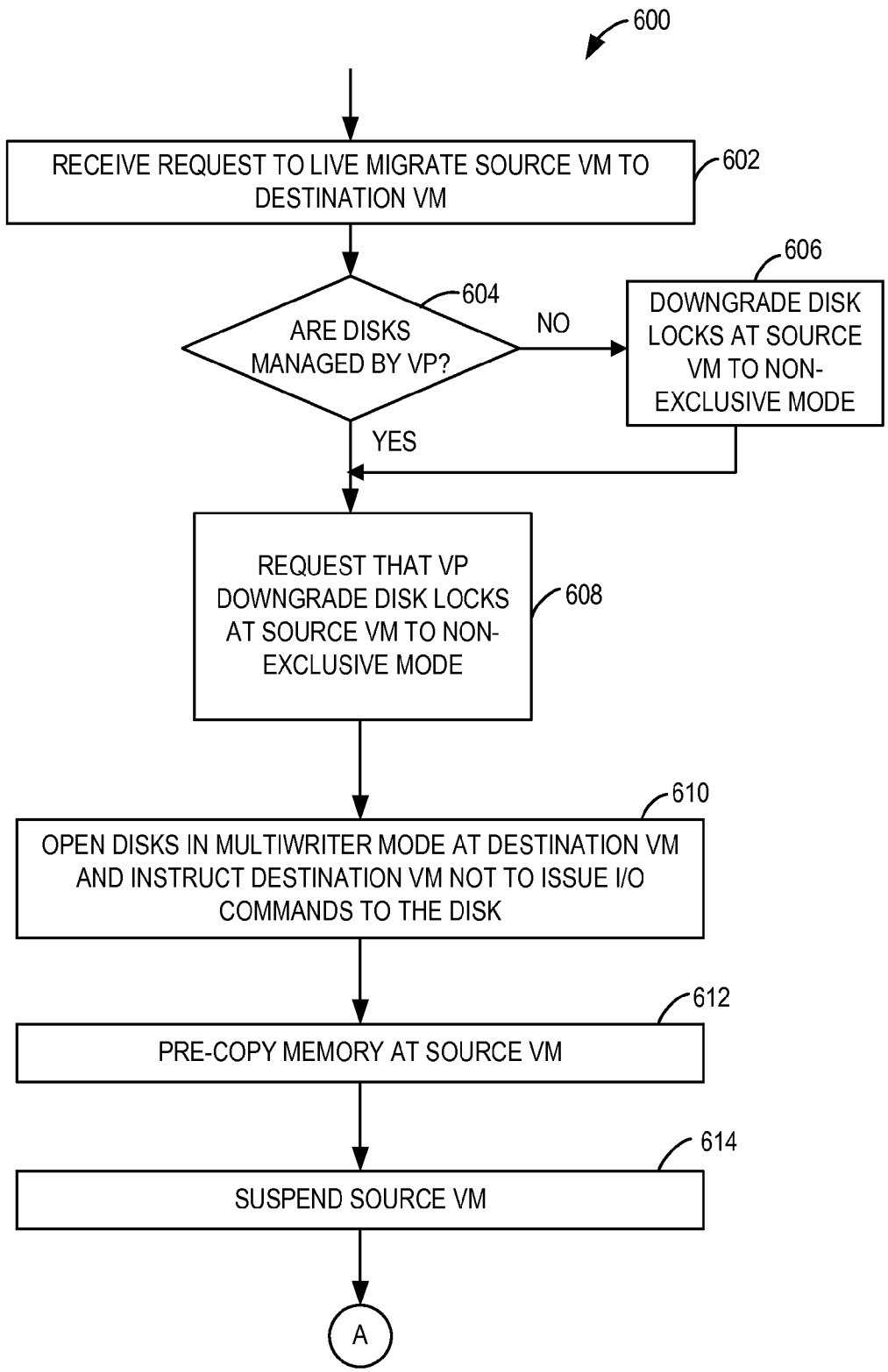
FIGS. 6A and 6B are flowcharts of an exemplary method of live migration of a source VM to a destination VM as performed by a hypervisor.
Figure 6B:
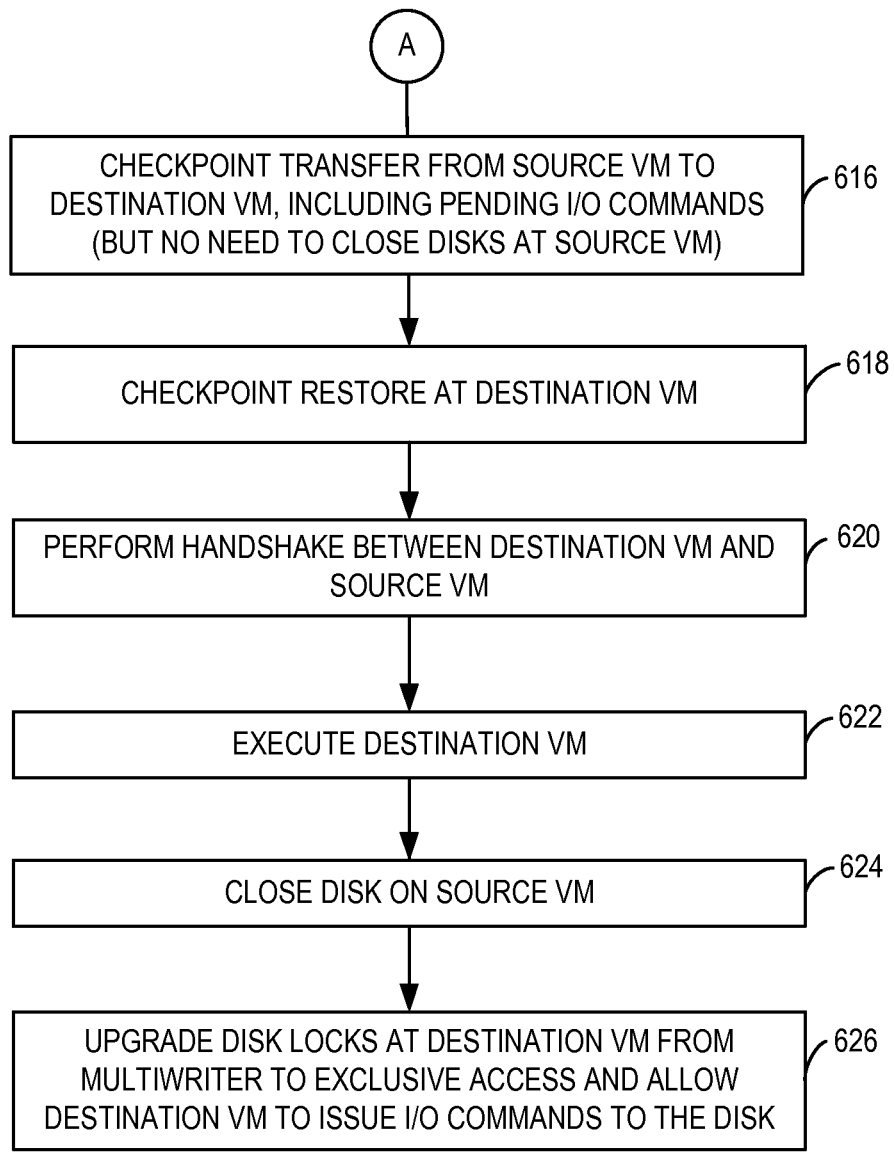

FIG. 6 is a flowchart of an exemplary method of live migration of the source VM 506 to the destination VM 526. While method 600 is described with reference to execution by the processor 102, it is contemplated that method 600 is performed by any computing device. In one example, hypervisor 210 directs the execution of commands by the processors on the source VM 506 and destination VM. Further, execution of the operations illustrated in FIG. 6 is not limited to a VM environment, but is applicable to any multi-source, multi-destination environment. Also, while some examples are drawn to migration of a single VM from a source host to a destination host, it is understood that the method may likewise be utilized for migration of multiple VMs. Also, one or more computer-readable storage media storing computer-executable instructions may execute to cause a processor to implement the live migration by performing the operations illustrated in FIG. 6.

Figure 7:
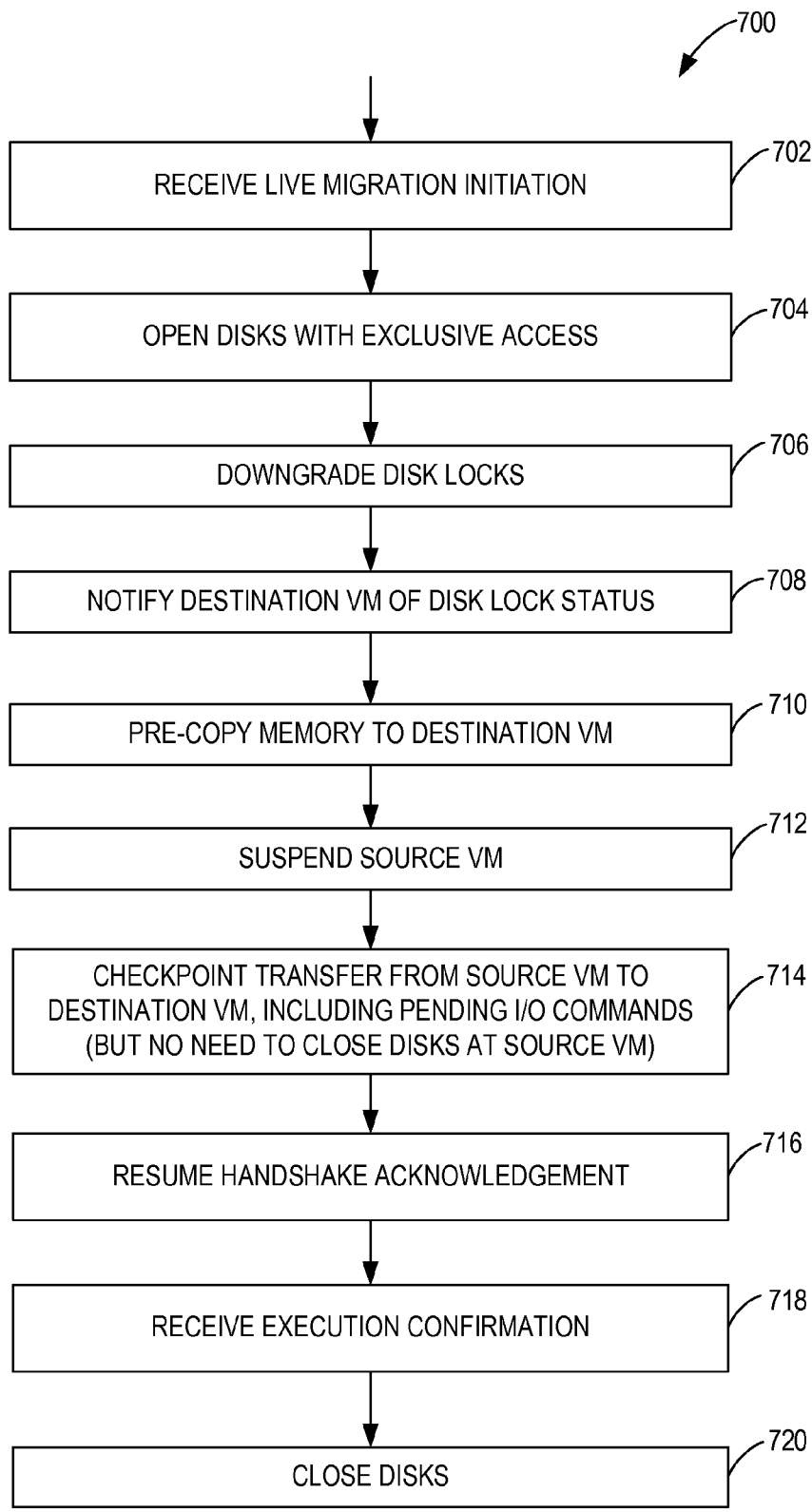
FIG. 7 is a flowchart of an exemplary method of live migration of a source VM to a destination VM from the perspective of the source VM.
Figure 8:
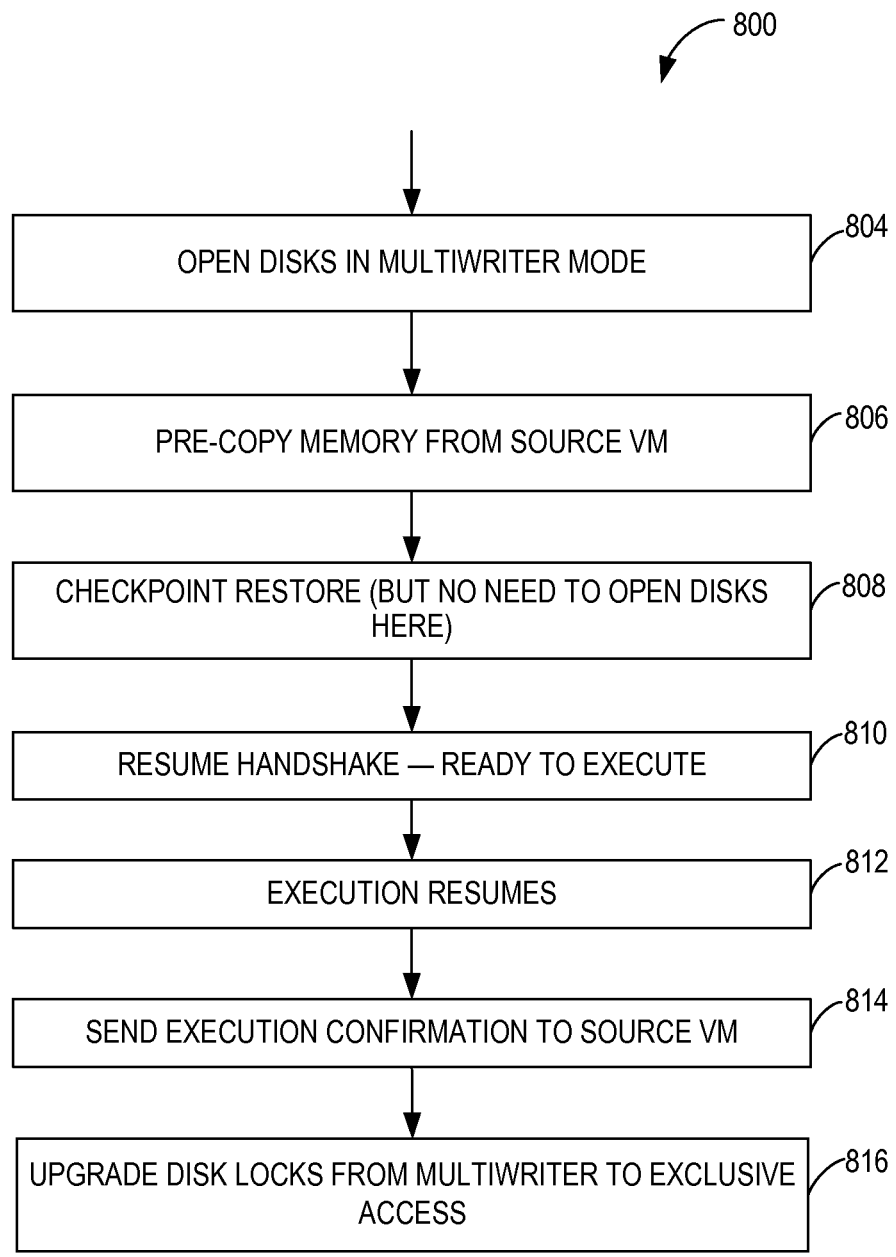
FIG. 8 is a flowchart of an exemplary method of live migration of a source VM to a destination VM from the perspective of the destination VM.

The operations of the exemplary method of FIG. 6 are carried out by the source VM 506 and the destination VM 526 working in conjunction with hypervisor 210. FIG. 6 illustrates the exemplary method from the point of view of hypervisor 210, while FIG. 7 is from the point of view of the source VM 506 and FIG. 8 is from the point of view of the destination VM 526.

FIG. 6 illustrates an example of live migration of a VM from the source host 502 to the destination host 522. This live migration begins after receipt of a trigger, condition, or other event at 602. For example, the event includes a request by a user for live migration of a VM from the source host 502 to the destination host 522. In other examples, the event is unplanned. For example, the event may be the source VM 506 or source host 502 reaching some operational threshold, such as the source VM 506 beginning to exceed the resources of the source host 502 or a designated quantity of users. The source VM 506 is then desired to be migrated to the destination host 522 with higher performance capabilities. As further examples, the source VM 506 may be live migrated for backup purposes, or to make it more accessible to different users. The event may also be pre-programmed, such as a timed switchover between systems or a timed backup.

After receipt of the triggering event, hypervisor 210 coordinates the commands to both the source VM 506 and the destination VM 526. In response to the triggering event, at 606 hypervisor 210 directs the source VM 506 to downgrade the locks on the disks 534 that are utilized by the source VM 506. In some examples, this entails changing the locks from an exclusive mode to a non-exclusive mode. In another example, downgrading the locks entails the source VMs 506 indicating to the disks 534 that the destination VM 526 is an authorized user. In another example, there may be no locks on the disks 534. In the event that the disks 534 are not locked (or have no locks), the sequence continues as illustrated in FIG. 6. In some examples of VVOLs, downgrading of locks of the disks 534 entails communication with the VP 532 managing the disks 534, at 604. In the event that the disks 534 are managed by the VP 532, the source VM 506 may request that the VP 532 downgrade the locks to non-exclusive mode at 608.

Following the downgrade of the locks of the disks 534, hypervisor 210 instructs the destination VM 526 to open the disks 534 in non-exclusive mode at 610. In one example, hypervisor 210 additionally instructs the destination VM 526 not to write to the disks 534 at 610. At this point, the source VM 506 is still executing, and no interruption of service is apparent to any user 108.

In one example, with the disks 534 open in a non-exclusive mode, the destination VM 526 is now free to pre-copy the memory of the disks 534 at 612. In this example, hypervisor 210 instructs the destination VM 526 to pre-copy the disks 534.

At 614, hypervisor 210 instructs the source VM 506 to suspend execution of the source VM 506. This is also be referred to as "stunning" the source VM 506. The suspension of the source VM 506 is initiated in any of a number of ways. For example, the destination VM 526 communicates to hypervisor 210 that it has completed opening the disks 534, and hypervisor 210 signals to the source VM 506 to suspend execution. Alternatively, the source VM 506 is suspended after pre-copy completes, or after a pre-determined duration of time. For example, after the source VM 506 downgrades the locks at 610 of the disks 534, the source VM 506 sets a timer to suspension based on historic migration times, the average time for migration of disks 534 of the relevant size, a time specified by the user, and/or a time related to a processing speed of the VP 532 hosting the disks 534. In some examples, the time between downgrading the disks 534 and suspending the source VM 506 may also be dependent on the bandwidth of the network 530, network congestion, and/or other fabric-related limitations such as link limitations, path length, LUN limitations, etc.

After suspending the source VM 506, at 616 the state of the source VM 506, or its "checkpoint", is transferred from the source host 502 to the destination host 522. It is unnecessary to close the disks 534 at the source VM 506 at this point. However, in one example, the disks 534 are closed by the source VM 506 at this point. The transfer of the state of the source VM 506 is unnoticeable by the user, in some examples. To effectuate the transfer, all relevant information regarding the source VM 506 may be transmitted to the destination VM 526, or hypervisor 210 specifies relevant information to transfer. This transfer includes, for example, I/O commands that have not yet been executed by the source VM 506, applications running on the source VMs 506, appropriate encryption/decryption data from the source VM 506, information regarding authorized users, cached data, or any other information associated with the source VM 506.

After the source host 502 has transmitted the checkpoint of the source VM 506 to the destination host 522, at 616, the destination host 522 restores the checkpoint of the destination VM 526 at 618. It is unnecessary to open the disks 534 at the destination VM 526 at this point, because the disks 534 were previously opened at the destination VM 526. In some examples, a one-way message is sent from the destination VM 526 to the source VM 506 informing the source VM 506 that the destination VM 526 is ready to execute at 620, after performing the checkpoint restore. This one-way message in vMotion is sometimes referred to as a Resume Handshake. The source VM 506 may also send a message to the destination VM 526 confirming receipt of the message from the destination VM 526. In yet another example, hypervisor 210 queries both the source and the destination VMs for status reports regarding the checkpoint transmission and restoration, and updates each VM.

With the checkpoint of the VM restored at the destination host 522, at 622 the host executes the destination VM 526. In some examples, the destination VM 526 is an exact copy of the source VM 506. However, in other examples the destination VM 526 does not execute every application of the source VM 506. For example, the user designates applications running on the source VM 506 which need not be executed on the destination VM 526, or the source VM 506 earmarks applications that are specific to the source host 502 and are not executed by the destination VM 526 on the destination host 522.

With the migrated VM running on the destination host 522, the source VM 506 closes the disks 534 at 624. In another example, the disk may have been closed when the VM checkpoint was transferred from the source host 502 to the destination host 522. Alternatively, the source VM 506 closes the disks 534 after receiving the Resume Handshake from the destination VM 526, or upon direction by hypervisor 210. In another example, the source VM 506 closes the disks 534 after an allotted amount of time has passed. The allotted amount of time may be designated, for instance, by the user, by the processor 102, or by the VP 532. In yet another example, the allotted amount of time is calculated by historical averages, by algorithms, or by any other process known in the art.

With the destination host 522 running the destination VM 526 and after the source VM 506 closes the disks, the destination VM 526 upgrades the disk locks from multi-writer to exclusive access at 626. In the example where hypervisor 210 directed the destination VM 526 not to write to the disks 534, hypervisor 210 now allows the destination VM 526 to write to the disks 534. In the example where the disks 534 did not contain locks, it is unnecessary to change the access of the disks 534.

In an example, the destination VM 526 is not permitted to issue I/O commands to the disks 534 while the source VM 506 has the disks 534 open. In this example, hypervisor 210 indicates to the destination VM 526 when it is allowed to write to the disks 534. In an alternative example, the source VM 506 itself sends a signal to the destination VM 526 after it has closed the disks 534. Other methods are contemplated, such as the destination VM 526 querying the disks 534 to determine whether the source VM 506 still has the disks 534 open, or the destination VM 526 querying the disks 534 for the status of the write mode of the disks 534.

FIG. 7 is a flowchart of an exemplary method of live migration of a VM from the source VM 506 to the destination VM 526, as performed by the source VM 506. While method 700 is described with reference to execution by hypervisor 210 contained on the source host 502, shown in FIG. 5, it is contemplated that method 700 may be performed by any computing device. Further, execution of the operations illustrated in FIG. 7 is not limited to a virtualized environment, but is applicable to any multi-source, multi-destination environment. Additionally, while some examples are drawn to migration of a single VM from a source host to a destination host, it is understood that the method is likewise utilized for migration of multiple VMs. Also, one or more computer-readable storage media storing computer-executable instructions may execute to cause a processor to implement the live migration by performing the operations illustrated in FIG. 7.

The operations of the exemplary method of FIG. 7 are carried out by the processor 508 associated with the source VM 506. Hypervisor 210 coordinates the operations carried out by the processor 508 associated with the source host 502 and the processor 510 associated with the destination host 522.

In FIG. 7, the source VM 506 receives a command to begin live migration at 702. This command is initiated, for example, from hypervisor 210, from a user 108, or may be triggered by an event occurring at the source VM 506. Triggering events are described above with reference to FIG. 6.

After receipt of the triggering event, the source VM opens the disks 534 with exclusive access at 704. If the disks 534 are already open, this step may be omitted. After the disks 534 associated with the source VM 506 are open, under the coordination of hypervisor 210, at 706 the source VM 506 downgrades the locks on the disks 534 that are utilized by the source VM 506. This may entail changing the locks from an exclusive mode to a non-exclusive mode. In another example, downgrading the locks entails the source VM 506 indicating to the disks 534 that the destination VM 526 are authorized users. In another example, there are no locks on the disks 534. In the event that the disks 534 are not locked, the sequence continues as illustrated in FIG. 7. In some examples, the downgrading of the locks entails communication with the VP 532 managing the disks 534. This communication, for example, is handled by the source VM 506, the source host, or hypervisor 210.

In an example, the source VM 506 notifies the destination VM 526 that the disks 534 are available for multiwriter access at 708. The source VM 506 may notify the destination VM 526 directly. In another example, the source VM 506 notifies hypervisor 210, and hypervisor 210 in turn notifies the destination VM 526. Alternatively, in the example wherein the disks 534 are managed by the VP 532, the VP 532 may broadcast the disk status to the destination VM 526.

In an example, with the disks 534 open in a non-exclusive mode, the memory of the source VM 506 is copied to the destination VM 526. This may be accomplished in several ways. For example, the destination VM 526 is now free to request to pre-copy the memory of the disks 534. In this example, hypervisor 210 instructs the destination VM 526 to pre-copy the memory of the disks 534 from the source VM 506 at 710. Alternatively, the source VM 506 initiates the pre-copy by transmitting its memory. Additionally, hypervisor 210 may coordinate the pre-copying of the memory of the source VM 506.

At 712, the source VM 506 is "stunned", or otherwise suspends execution. The suspension of the source VM 506 may be initiated in a number of ways. For example, the destination VM 526 communicates to hypervisor 210 that it has completed opening the disks 534, and hypervisor 210 signals to the source VM 506 to suspend execution. Alternatively, the source VM 506 suspends after a pre-determined duration of time. As a further example, the source VM 506 downgrades the locks of the disks 534 and sets a timer corresponding to historic migration times, the average time for migration of disks 534 of the relevant size, a time specified by the user, and/or a time related to the processing speed of the VP 532 hosting the disks 534. The time between downgrading the disks 534 and suspending the source VMs 506, in one example, is dependent on the bandwidth of the network 530, network congestion, and/or other fabric-related limitations such as link limitations, path length, LUN limitations, etc.

After suspending the source VM 506, at 714 the state of the source VM 506, or its "checkpoint", is transferred from the source host 502 to the destination host 522. It is unnecessary to close the disks 534 at the source VM 506 at this point.

In some examples, the source VM 506 receives a one-way message sent from the destination VM 526 informing the source VM 506 that the destination VM 526 is ready to execute at 716 (e.g., a Resume Handshake acknowledgement).

In some examples, the source VM 506 receives notification that the destination VM 526 is executing at 718. With the migrated VM running on the destination host 522, the source VM 506 closes the disks 534 at 720. In another example, the disks 534 have been closed when the VM checkpoint is transferred from the source host 502 to the destination host 522. Alternatively, the source VM 506 closes the disks 534 upon direction by hypervisor 210. In another example, the source VM 506 closes the disks 534 after an allotted amount of time has passed. The allotted amount of time is designated, for instance, by user 108, by hypervisor 210, or by the VP 532. In yet another example, the allotted amount of time is calculated by historical averages, by algorithms, and/or by any other process known in the art.

In an example, the destination VM 526 is not permitted to issue I/O commands to the disks 534 while the source VM 506 has the disks 534 open. That is, the destination VM 526 issues I/O commands to the disks 534 only after the source VM 506 closes the disks 534.

In this example, the source VM 506 itself sends a signal to the destination VM 526 after it has closed the disks 534, or the source VM 506 communicates its closure of the disks 534 to hypervisor 210, which would inform the destination VM 526 that the source VM 506 has closed the disks 534.

FIG. 8 is a flowchart of an exemplary method of live migration of a VM from the source VM 506 to the destination VM 526 from the perspective of the destination VM 526. While method 800 is described with reference to execution by the processor 510, shown on the destination host 522 on a system such as shown in FIG. 5, it is contemplated that method 800 may be performed by any computing device. Further, execution of the operations illustrated in FIG. 8 is not limited to a virtualized environment, but is applicable to any multi-source, multi-destination environment. Also, while the claim language is drawn to migration of a single VM from a source host to a destination host, it is understood that the method may likewise be utilized for migration of multiple VMs. Also, one or more computer-readable storage media storing computer-executable instructions may execute to cause a processor to implement the live migration by performing the operations illustrated in FIG. 8.

The exemplary operations of FIG. 8 are carried out by the destination VM 526, and the destination VM 526 works in conjunction with hypervisor 210 and the source VM 506.

In some example, hypervisor 210 coordinates the commands to both the source VMs 506 and the destination VM 526. Following the downgrade the locks of the disks 534 by the source VM 506, hypervisor 210 instructs the destination VM 526 to open the disks 534 in non-exclusive mode at 804. The non-exclusive mode is, for example, a multi-writer mode. In another example, the non-exclusive mode permits the source VM 506 to designate authorized users. In that example, the authorized users are the source VM 506 and destination VM 526. In one example, hypervisor 210 additionally instructs the destination VM 526 not to write to the disks 534. At this point, the source VM 506 is still executing, and no interruption of service has occurred, or is apparent to any user.

In one example, with the disks 534 open in a non-exclusive mode, the destination VM 526 is now free to pre-copy the memory of the disks 534. In this example, hypervisor 210 instructs the destination VM 526 to pre-copy the memory of the disks 534 at 806. Once the destination VM 526 has finished the pre-copy, the source VM 506 is suspended. The destination VM 526, in some examples, receives notification that the source VM 506 has been stunned. This notification may be received from hypervisor 210, or from the source VM 506 itself.

After suspending the source VM 506, the state of the source VM 506, or its "checkpoint", is transferred from the source host 502 to the destination host 522 at 808. To effectuate such a transfer, all relevant information regarding the source VM 506 is transmitted to the destination VM 526 (or hypervisor 210, in another example, specifies relevant information). The destination VM 526 receives, for example, I/O commands that have not yet been executed by the source VMs 506, applications running on the source VMs 506, appropriate encryption/decryption data from the source VMs 506, information regarding authorized users, cached data, or any other information associated with the source VMs 506.

After receiving the checkpoint data, the destination VM 526 applies the checkpoint data to restore itself to reflect the transmitted checkpoint of the source VM at 812. After applying the checkpoint data, in some examples, a one-way message is sent from the destination VM 526 to the source VM 506 informing the source VM 506 that the destination VM 526 is ready to execute at 810. In other examples, the source VM 506 sends a message to the destination VM 526 confirming receipt of the message from the destination VM 526. In yet another example, hypervisor 210 queries both the source and the destination VMs for status reports regarding the checkpoint transmission and restoration, and exchanges that information with the VMs.

With the checkpoint of the VM restored at the destination VM 526, at 812 the destination host 522 executes the destination VM 526. In some examples, the execution of the destination VM 526 occurs upon receipt of notification that the source VM 506 has terminated execution of the source VM 506. This notification comes, for example, from hypervisor 210, or from the source VM 506 itself. Following execution of the destination VM 526, the destination VM 526, in some examples, notifies the source VM 506 that the destination VM 526 is executing at 814.

Those skilled in the art will note that the destination VM 526 utilizes the checkpoint information transmitted from the source host 502 to duplicate the source VM 506. In some examples, the destination VM 526 is an exact copy of the source VM 506. However, in other examples the destination VM 526 does not execute every application of the source VM 506. For example, the user may designate applications running on the source VM 506 which need not be executed on the destination VM 526, or the source VM 506 may earmark applications that are specific to the source host 502 and are not executed by the destination VM 526 on the destination host 522.

With the destination host 522 running the destination VM 526, after the source VM 506 has closed the disks 534, the destination VM 526 upgrades the disk locks from multi-writer to exclusive access at 816. In examples where hypervisor 210 directed the destination VM 526 not to write to the disks 534, hypervisor 210 now allows the destination VM 526 to write to the disks 534. In an additional example where the disks 534 did not contain locks, it is unnecessary to change the access of the disks 534.

In an example, the destination VM 526 is not permitted to issue I/O commands to the disks 534 while the source VM 506 has the disks 534 open. In this example, hypervisor 210 indicates to the destination VM 526 when the destination VM 526 is allowed to write to the disks 534. In an alternative example, the destination VM 526 receives a signal from the source VM 506 after the source VM 506 has closed the disks 534. Other methods are contemplated, such as the destination VM 526 querying the disks 534 to determine whether the source VM 506 still has the disks 534 open, or the destination VM 526 querying the disks 534 for the status of the write mode of the disks 534.

Figure 9A:
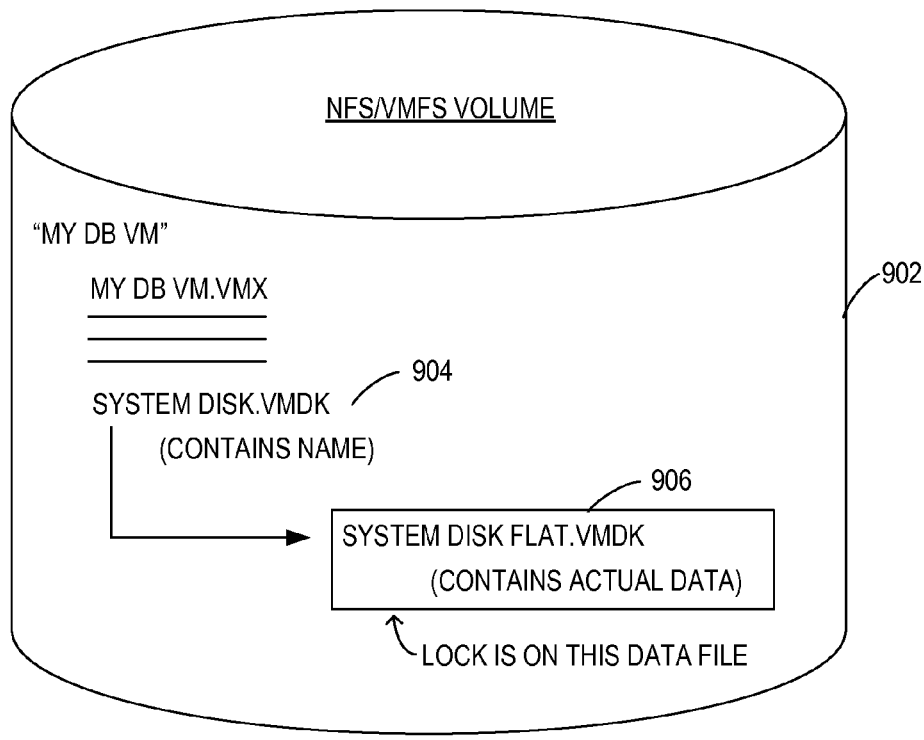
FIG. 9A is a block diagram of an exemplary disk lock structure for a network file system (NFS) or virtual machine file system (VMFS) volume.
Figure 9B:
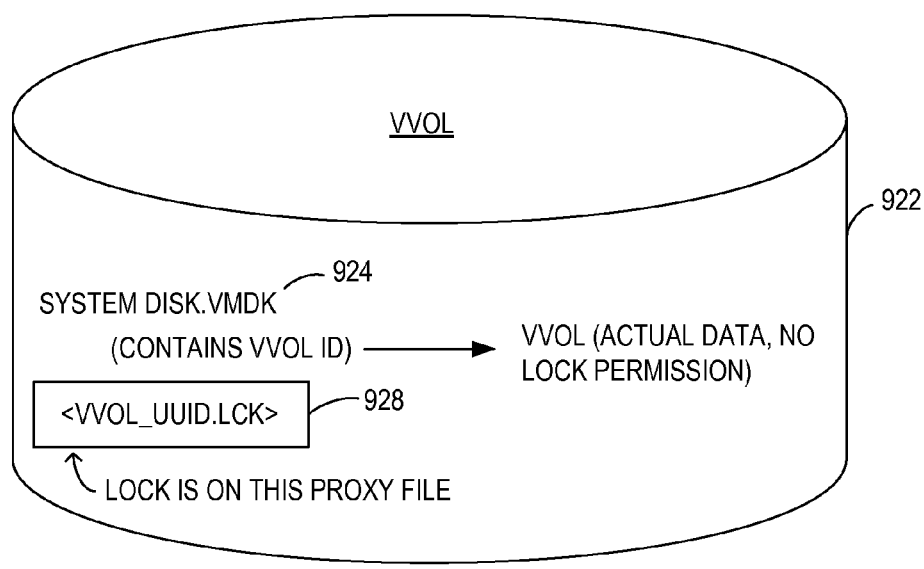
FIG. 9B is a block diagram of an exemplary disk lock structure for a virtual volume (VVOL).

FIG. 9A is a block diagram of an exemplary disk lock structure for a network file system (NFS) or VM file system (VMFS) 902. FIG. 9B is a block diagram of an exemplary disk lock structure for a virtual volume (e.g., VVOL 922). Depending on the type of disk associated with the host VM, the locking mechanism may be downgraded by the host in various manners.

For example, locking is different for VVOL 922 versus NFS/VMFS 902. In NFS/VMFS 902, the systemdisk.vmdk 904 contains the name of the system, and points to a flat file (e.g., data containing file) such as systemdiskflat.vmdk 906. The locks are placed on the flat file itself (e.g., the extent).

For VVOLs 922, the systemdisk.vmdk 924 contains a VVOL_ID which points to the VVOL backend and to a lock file such as VVOL_UUID.lck file 928. UUID refers to universally unique identifier, in some examples. For VVOLs 922, the lock is not on the backend data itself (e.g., VVOL) which has no lock primitives, but instead on the proxy file VVOL_UUID.lck file 928.

As described herein, the destination VM 526 opens disks 534 prior to the source VM 506 being stunned (e.g., the destination VM 526 pre-opens the disks 534), with the destination VM 526 taking exclusive ownership of the disks 534 after completion of the migration. However, it is also possible that the disks 534 associated with the system are not locked. While some examples are described herein with reference to shared disk locks, .lck files, and the like, the disclosure contemplates any form of shared disks 534—with or without locks. Some examples do not take any locks against the disks 534 (e.g., VVOL.lck files) and/or do not create new .lck files for the destination VM 526. In these examples, the disclosure is operable with shared disks 534, but unshared disk locks (e.g., there are no disk locks). Aspects of the disclosure are operable with any mechanism for taking exclusive ownership of the disk and/or any mechanism allowing the destination VM 526 to open the disks 534.

Each VVOL 922, in some examples, is provisioned from a block based storage system. In an example, a NAS (network attached storage) based storage system implements a file system on top of data storage units (DSUs) and each VVOL 922 is exposed to computer systems as a file object within this file system.

In general, VVOLs 922 have a fixed physical size or are thinly provisioned, and each VVOL 922 has a VVOL ID (identifier), which is a universally unique identifier that is given to the VVOL 922 when the VVOL 922 is created. For each VVOL 922, a VVOL database stores, for each VVOL 922, the VVOL ID, the container ID of the storage container in which the VVOL 922 is created, and an ordered list of <offset, length> values within that storage container that comprise the address space of the VVOL 922. The VVOL database is managed and updated by a volume manager, which in an example, is a component of a distributed storage system manager. In an example, the VVOL database also stores a small amount of metadata about the VVOL 922. This metadata is stored in the VVOL database as a set of key-value pairs, and may be updated and queried by computer systems via an out-of-band path at any time during existence of the VVOL 922. Stored key-value pairs fall into three categories, in some examples. The first category is well-known keys (e.g., the definition of certain keys, and hence the interpretation of their values, are publicly available). One example is a key that corresponds to the virtual volume type (e.g., in virtual machine examples, whether the VVOL 922 contains the metadata or data of a VM). Another example is the App ID, which is the ID of the application that stored data in the VVOL 922. The second category is computer system specific keys (e.g., the computer system or its management module stores certain keys and values as the metadata of the virtual volume). The third category is storage system vendor specific keys. These allow the storage system vendor to store certain keys associated with the metadata of the virtual volume. One reason for a storage system vendor to use this key-value store for its metadata is that all of these keys are readily available to storage system vendor plug-ins and other extensions via the out-of-band channel for VVOLs 922. The store operations for key-value pairs are part of virtual volume creation and other processes, and thus the store operations are reasonably fast. Storage systems are also configured to enable searches of virtual volumes based on exact matches to values provided on specific keys.

EXEMPLARY OPERATING ENVIRONMENT

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the invention constitute exemplary means for implementing live migration using shared disk locks. For example, the elements illustrated in the figures, such as when encoded to perform the operations illustrated in the figures, constitute exemplary means for receiving a request to perform a live migration of a source VM on a source host to a destination VM on a destination host, exemplary means for downgrading locks on disks of the source VM from an exclusive mode to a non-exclusive mode in response to the received request, exemplary means for opening the disks on the destination VM in non-exclusive mode, exemplary means for pre-copying memory on the source VM, exemplary means for suspending execution of the source VM, exemplary means for transferring virtual memory of the source VM to the destination VM, exemplary means for executing the destination VM, exemplary means for closing the disks on the source VM, and exemplary means for upgrading the locks on the destination VM from the non-exclusive mode to the exclusive mode.

Some examples are described herein with reference to virtual volumes (VVOLs). According to some examples, a storage system cluster creates and exposes VVOLs to connected computer systems. Applications (e.g., VMs accessing their virtual disks, etc.) running in computer systems access the VVOLs on demand using standard protocols, such as SCSI (small computer simple interface) and NFS (network file system) through logical endpoints for the SCSI or NFS protocol traffic, known as "protocol endpoints" (PEs), that are configured in storage systems.

While some of the examples are described with reference to VVOLs offered by VMware, Inc., aspects of the disclosure are operable with any form, type, origin, or provider of virtual volumes.

Alternatively or in addition to the other examples described herein, examples include any combination of the following:
   pre-copying memory from the source VM to the destination VM after downgrading the lock
   restoring the virtual device state on the destination VM before executing the destination VM
   the destination VM issues input/output (I/O) commands to the disk only after closing the disk on the source VM
   suspending execution of the source VM occurs after a pre-defined duration of time has elapsed since the destination VM opened the disk in the non-exclusive mode
   opening the disk on the destination VM in the non-exclusive mode comprises communicating with a vendor provider managing the disk
   commands to the source VM while it is stunned are transmitted to the destination VM for execution after the live migration.

Alternatively or in addition to the other examples described herein, examples include any combination of the following performed by the source VM (e.g., source VM 506):
   receive a request to perform a live migration of the source VM to a destination VM, and downgrading comprises downgrading the locks in response to the received request
   suspend execution of the source VM after a pre-defined duration of time has elapsed since the destination VM opened the disks in the non-exclusive mode
   send a message to the destination VM, after downgrading the locks, that multiwriter mode is available for the disks
   calculate the time involved for live migration from the source VM to the destination VM
   commence the process of live migration after a trigger.

Alternatively or in addition to the other examples described herein, examples include any combination of the following performed by the destination VM (e.g., destination VM 526):
   the one or more disks are selected from a group consisting of a virtual volume, a virtual storage array, and a virtual storage area network open the one or more disks on the destination VM in a multiwriter lock mode.

restore the virtual device state of the source VM on the destination VM issue input/output (I/O) commands to the disks only after the source VM closes the disks execute the destination VM in response to receiving an acknowledgment from the source VM that execution of the source VM is terminating.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

We claim:

1. A method comprising:

receiving a request to perform a live migration of a source virtual machine (VM) on a source host to a destination VM on a destination host;

in response to the received request, downgrading a lock on at least one disk of the source VM from an exclusive mode to a non-exclusive mode;

opening the disk on the destination VM in the non-exclusive mode while the source VM is executing;

suspending execution of the source VM;

transferring a virtual device state of the source VM to the destination VM;

executing the destination VM;

closing the disk on the source VM; and upgrading the lock on the disk by the destination VM from the non-exclusive mode to the exclusive mode.

2. The method of claim 1, further comprising pre-copying memory from the source VM to the destination VM after downgrading the lock.

3. The method of claim 1, further comprising restoring the virtual device state on the destination VM before executing the destination VM.

4. The method of claim 1, wherein the destination VM issues input/output (I/O) commands to the disk only after closing the disk on the source VM.

5. The method of claim 1, wherein suspending execution of the source VM occurs after a pre-defined duration of time has elapsed since the destination VM opened the disk in the non-exclusive mode.

6. The method of claim 1, wherein opening the disk on the destination VM in the non-exclusive mode comprises communicating with a vendor provider managing the disk.

7. The method of claim 1, wherein commands to the source VM while it is stunned are transmitted to the destination VM for execution after the live migration.

8. One or more non-transitory computer-readable storage media including computer-executable instructions that, when executed, cause at least one processor to perform live migration using shared disk locks by:

downgrading locks on one or more disks of a source virtual machine (VM) from an exclusive mode to a non-exclusive mode, wherein a destination VM opens the disks in non-exclusive mode while the source VM is executing;

suspending execution of the source VM;

transferring virtual memory of the source VM to the destination VM, wherein the destination VM begins execution after restoration of the virtual memory at the destination VM; and closing the disks on the source VM, wherein the destination VM upgrades the locks from the non-exclusive mode to the exclusive mode.

9. The computer-readable storage media of claim 8, wherein the computer-executable instructions further cause at least one processor to receive a request to perform a live migration of the source VM to a destination VM, and wherein downgrading comprises downgrading the locks in response to the received request.

10. The computer-readable storage media of claim 8, wherein the computer-executable instructions further cause at least one processor to pre-copy memory from the source VM to the destination VM after downgrading the locks.

11. The computer-readable storage media of claim 8, wherein the computer-executable instructions cause the at least one processor to suspend execution of the source VM after a pre-defined duration of time has elapsed since the destination VM opened the disks in the non-exclusive mode.

12. The computer-readable storage media of claim 8, wherein the computer-executable instructions cause the at least one processor to send a message to the destination VM, after downgrading the locks, that multiwriter mode is available for the disks.

13. The computer-readable storage media of claim 8, wherein the computer-executable instructions cause the at least one processor to calculate the time involved for live migration from the source VM to the destination VM.

14. The computer-readable storage media of claim 8, wherein the computer-executable instructions cause the at least one processor to commence the process of live migration after a trigger.

15. A system for performing live migration with one or more shared disks, said system comprising:

a memory area associated with a computing device, said memory area storing a destination virtual machine (VM); and a processor programmed to:
  open, in a non-exclusive mode on the destination VM, one or more disks associated with a source VM while the source VM is executing;
  execute the destination VM after receiving a virtual device state of the source VM; and
  after the source VM closes the disks, change the disks from the non-exclusive mode to an exclusive mode.

16. The system of claim 15, wherein the one or more disks are selected from a group consisting of a virtual volume, a virtual storage array, and a virtual storage area network.

17. The system of claim 15, wherein the processor is programmed to open the one or more disks on the destination VM in a multiwriter lock mode.

18. The system of claim 15, wherein the processor is further programmed to restore the virtual device state of the source VM on the destination VM.

19. The system of claim 15, wherein the processor is further programmed to issue input/output (I/O) commands to the disks only after the source VM closes the disks.

20. The system of claim 15, wherein the processor is programmed to execute the destination VM in response to receiving an acknowledgment from the source VM that execution of the source VM is terminating.

* * * * *